Patented May 2, 1944

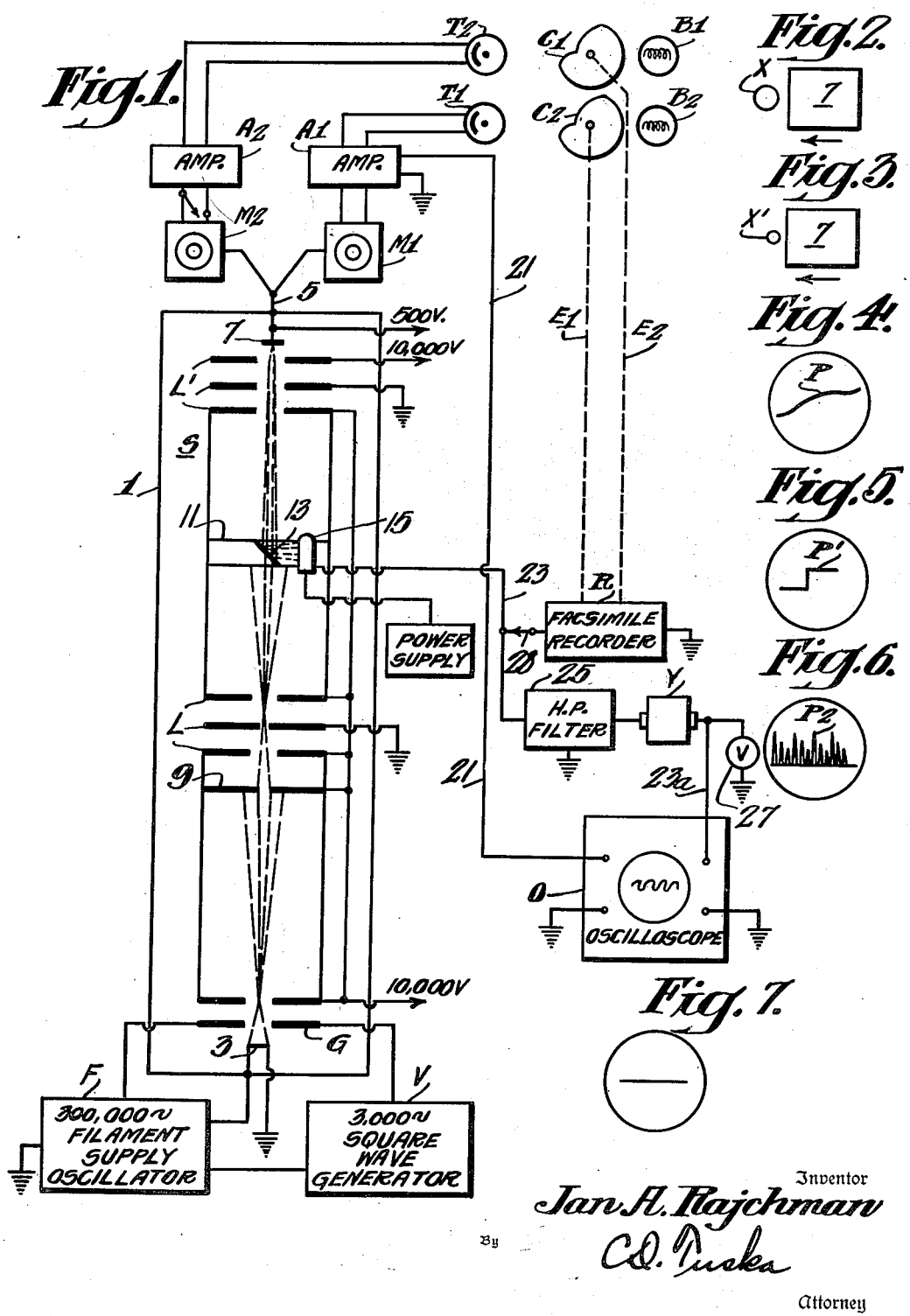

2,348,031

UNITED STATES PATENT OFFICE 2,348,031

METHOD OF FOCUSING ELECTRON MICROSCOPES

Jan A. Rajchman, Philadelphia, Pa., assignor to Radio Corporation of America, a corporation of Delaware Application April 30, 1942, Serial No. 441,167

4 Claims. (Cl. 250—49.5)

This invention relates generally to electron microscopes and particularly to methods and means for focusing an electron beam in such microscopes to obtain maximum definition in the reproduced image. For the purpose of illustration, the invention will be described with reference to its application to a scanning microscope in which the specimen is explored or scanned by an electron probe or beam, and wherein the primary electrons passing through a specimen, or the secondary electrons emanating from it, are used to actuate a suitable integrating device such as a facsimile recorder.

It is known to those skilled in the art that the resolving power of an electron microscope of the scanning type depends solely on the sharpness of the focus of the electron beam at the point of contact with the specimen. Von Ardenne points out in his U. S. Patent 2,257,774, granted on October 7, 1941, that optimum results are achieved when the diameter of the electron beam at the point of contact with the specimen is less than the wave length of light.

One problem which has caused considerable difficulty in the operation of scanning microscopes is that of determining whether or not the electron beam is of the smallest possible diameter at the point of contact with the specimen. Due to the customary slow scanning speed of such microscopes, substantially instantaneous means for indicating the focus of the electron beam are necessary in order that correction of the focus can be made at any time during the scanning interval.

The copending application of Richard L. Snyder, Jr., Serial No. 396,099, filed May 31, 1941, described and generally claims a method for indicating high frequency components in the signal output of a scanning microscope, and controlling the focus of the microscope to produce a maximum high frequency output which is indicative of optimum focus of the electron beam at the point of contact with the specimen. The instant invention is an improvement over the method described in the above mentioned Snyder application.

Accordingly, the principal object of the present invention is to provide an improved method of and means for determining quickly and easily whether or not the electron beam or probe of a scanning type microscope is properly focused. Another object of the invention is to provide an improved method of and means for filtering out all but the high frequency components in the microscope signal output, indicating the level of such high frequency components, and adjusting the focus of the electron beam to the adjustment where the high frequency components in the signal output are a maximum. The level of the high frequency components in the signal output may be indicated either by a cathode ray oscillograph or a meter or other device for indicating power, current, or voltage depending upon the particular form of filter circuit used.

The invention will be described by reference to the drawing of which Figure 1 is a schematic view of a scanning type of electron microscope as described and claimed by Richard L. Snyder, Jr., in his copending application Serial No. 391,188, filed April 30, 1941; Figures 2 and 3 are diagrammatic views illustrative of the movement of the specimen with respect to primary electron beams of different diameters; and Figures 4, 5, 6 and 7 are graphs of wave patterns indicative of different conditions of focus in the electron microscope of Fig. 1.

Referring to Fig. 1, the apparatus comprises an electron microscope indicated generally by S, a facsimile recorder R, of conventional design, for producing a permanent image or micrograph of the specimen under examination, a cathode ray oscilloscope O, a meter 27 for producing visible indications of the focus of the electron beam, and a high-pass filter circuit 25 for limiting the signal currents applied to the indicators to the high frequency components thereof.

The microscope S comprises an elongated evacuated receptacle 1 containing, adjacent one end, an electron-emissive cathode 3 and, adjacent its opposite end, a movable rod-like lever element 5 on the inner end of which an object holder 7 containing an object or specimen (not shown) to be examined is mounted. Intermediate the cathode 3 and object holder 7 is an electron lens system including a first apertured plate 9, a first group of lens elements L, a second apertured plate 11, and a series of objective lens elements L', through all of which electrons pass, in an undeviating path, to the object under examination.

As taught by Von Ardenne, the diameter of the electron beam at the point at which it impinges the object should preferably be less than the wave length of light. The scanning movement necessary to a complete examination of every part of the object is provided by moving the object holder 7 with respect to the beam in a manner later described. Secondary electrons, released by impact of the steady primary beam on the moving object, travel in the return direction through the objective lens elements L' and impinge on a fluorescent target 13 which is preferably provided on the wall surrounding the opening in the plate 11 through which the primary beam passes on its way to the objective lens. A photosensitive amplifier, for example, an electron multiplier 15, mounted adjacent the fluorescent surface 13, picks up the visible or invisible light rays therefrom and generates an augmented electron current proportionate to the intensity of the secondary electron stream from the object. The output of the multiplier, in this case, serves to actuate the facsimile recorder R which is operated in synchronism with the object holder 7 to provide a permanent, enormously magnified image of the surface of the object thus "scanned."

The distance the object is moved by the scanning mechanism must, of course, be exceedingly small when a greatly magnified recorder image is desired. To achieve such small movement, mechanically, the lever 5 which supports the object holder 7 may be pivoted close to the object end of the lever, and the driving force applied to its opposite or outer end. In an arrangement wherein the specimen is mounted one-half inch from the fulcrum of the lever 5 and the driving force applied five inches from the fulcrum, the resulting reduction of ten to one is satisfactory. In the illustrated arrangement, two dynamic-type loudspeaker motors M1 and M2 are employed for imparting the requisite scanning movement to the object holder 10; one motor (M1) serving to provide the line-scanning movement and the other (M2), the frame-scanning movement.

The motors M1 and M2 are actuated through suitable amplifiers A1 and A2 by photo tubes T1 and T2, respectively, which are illuminated by light from two lamps B1 and B2 controlled by rotating spiral shutters or cams C1 and C2, which are driven through a mechanical coupling E1, E2 by the line and frame scanning mechanism of the recorder R. Where the recording equipment employs an auxiliary amplifier (not shown) which requires a carrier frequency, such carrier may be introduced by interrupting the primary beam from the electron gun by impressing an alternating voltage of the desired frequency and wave shape on the control grid of the gun, as indicated at G. A detector shunted by a suitable filter, indicated generally at Y, may be provided if desired to remove the carrier from the signal current supplied to the oscilloscope O. The filament heating current supply is provided by a regulated high frequency source F, which is turned on only during the time the beam is cut off by the carrier generator V. Thus, when the beam is "on," no heating current, and hence no disturbing magnetic field or potential, is present when electrons are being emitted.

As previously indicated, the cathode ray oscilloscope O may be employed for determining the condition of focus of the primary electron beam in the microscope S. To this end the horizontal deflecting plates (or coils) of the oscilloscope are shown connected as through a lead 21 to the amplifier A1 which supplies the driving current for the line scanning mechanism of the microscope, and the vertical deflecting plates (or coils) are supplied with signal currents from the electron multiplier 15 through an extension 23a of the lead 23 which supplies signaling current to the recorder R and through a suitable high-pass filter 25 which passes only the high frequency components of the signal output. Ordinarily the oscilloscope will remain in circuit while the recorder R is in operation so that any lack of focus which may develop during the recording interval may be observed and corrected forthwith. However, a suitable switch 28 may be provided, if desired, for disconnecting the recorder during the focusing tests.

The currents supplied to the vertical deflecting plates of the oscilloscope from the photosensitive multiplier 15, is proportional to the intensity of the secondary electron stream from the object under examination. Thus, if the primary beam or probe should fail to strike the specimen or other "target" capable of secondary emission there will be no current applied to the said plates. Assuming now that a "target" capable of secondary emission be moved slowly into the field of the beam it will be apparent that the time it takes for the said current to rise from zero to maximum will be a measure of the relative diameter of the primary beam in the microscope. This is visually indicated in Figs. 2 and 3 wherein 7 indicates an object or target capable of secondary emission and X, X' indicate electron probes of different diameters. In Fig. 2, if the target 7 is moved slowly into the field of the larger primary beam X the secondary emission resulting from impact of the beam will exhibit a gradual rise, indicated by the slope of the oscillograph pattern P, Fig. 4, from zero to maximum as more and more of the primary beam is presented to the target. On the other hand, referring now to Figs. 3 and 5, when the primary beam X1 is of substantially smaller diameter, the rise from zero current (just prior to the time the edge of the target contacts the periphery of the beam) to maximum current (when the full area of the beam impinges the target) as the target 7 is moved, at the same rate as before, into the beam X1, will be much more abrupt and may in fact comprise a square top wave similar to the one shown P' in Fig. 5. Since, as is well kown in the art, a "square top wave" has a large high frequency content in its makeup it will now be apparent that the relative amount of high frequency components in the output current of a scanning type electron microscope provides a useful indication of the focus or point-sharpness of the beam in the object plane subject to investigation.

As a practical matter the foregoing method of determining whether or not the beam or probe in the microscope S is properly focused, may be carried out in several different ways either before or after the object to be examined is mounted upon the specimen holder. Thus if the holder itself be secondarily emissive the desired contrast may be achieved by moving an edge of the holder into or out of the beam. Alternatively, if the emissive ratio of the holder under bombardment by the beam is less than or greater than that of the object per se an informative pattern may be achieved by successively moving the holder and the specimen into or out of the path of the beam. In any event the force required to move the holder during the testing interval may be supplied by the motor M1 which normally provides the line scanning movement. Since ordinarily this movement is not so great as to move the holder out of the range of the beam the intensity of the driving current supplied by the amplifier A1 may be altered to provide the desired degree of movement of the lever arm 5 to which the holder 7 is affixed. Alternatively, the adjustment may be made mechanically by moving the specimen-moving assembly, including the scanning motors, lever and lever fulcrum in the desired direction.

The condition of focus of the microscope primary beam may also be ascertained in accordance with the invention without altering the normal arrangement or movement of the specimen with respect to the beam, simply by observing the relative presence or absence of high frequency components in the output current of the microscope during normal operation, e. g., during a recording interval. Thus, with the oscilloscope connected to the output of the high-pass filter 25 in the manner indicated in Fig. 1, only the high frequency components of the signal derived from the multiplier 15 will provide vertical deflection of the oscilloscope pattern and will be manifest by sharp vertical undulations, indicated at P2, Fig. 6, in the main pattern of the wave. The absence of such sharp vertical undulations in the wave pattern of Fig. 7 is indicative of a lack of focus in the primary electron beam of the microscope. The focus of the electron beam is therefore adjusted to provide maximum vertical deflection on the oscilloscope.

The focus of the beam may be corrected, when necessary, either by changing the relative potential distribution among the lens element of the electron lens system L, L', or by moving the object holder with respect to the focal spot or cross-over point of the electrons on the target-side of the objective lens L'.

An alternative method, which may be substituted for or used in conjunction with the method using the oscilloscope O, is to measure the high frequency output power, voltage or current of the high-pass filter circuit 25 by means of a suitable meter 27 of conventional design suitably connected in the filter output circuit. With this latter arrangement the electron beam focus is adjusted until the meter 27 provides a maximum indication.

I claim as my invention:

1. The method of adjusting the focus of an electron beam in an electron microscope having a signal output circuit in which the signal amplitude is a function of the electron image contrast including the steps of filtering said signals to pass only predetermined high frequency components thereof, indicating the output level of said filtered signals, and altering the effective diameter of said beam until said indicated level is a maximum.

2. The method described in claim 1 including recording said signal output level.

3. The method of adjusting the focus of an electron beam in an electron microscope having a signal output circuit in which the signal amplitude is a function of the electron image contrast, and a cathode ray oscillograph associated with said circuit including the steps of filtering said signals to pass only predetermined high frequency components thereof, applying said filtered signals to said oscillograph to indicate the output level of said filtered signals, and altering the effective diameter of said beam until said oscillograph indication is a maximum.

4. The method described in claim 3 including recording said signal output level.

JAN A. RAJCHMAN.